US012629717B2

(12) United States Patent
Horikawa et al.

(10) Patent No.: US 12,629,717 B2
(45) Date of Patent: May 19, 2026

(54) POWDER COATING DEVICE

(71) Applicant: Panasonic Intellectual Property Management Co., Ltd., Osaka (JP)

(72) Inventors: Akihiro Horikawa, Osaka (JP); Toshiyuki Kojima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 471 days.

(21) Appl. No.: 18/460,725

(22) Filed: Sep. 5, 2023

(65) Prior Publication Data

US 2023/0405632 A1 Dec. 21, 2023

Related U.S. Application Data

(63) Continuation of application No. PCT/JP2022/008949, filed on Mar. 2, 2022.

(30) Foreign Application Priority Data

Mar. 18, 2021 (JP) ................................ 2021-044784

(51) Int. Cl.
*B05C 11/04* (2006.01)
*B05C 19/04* (2006.01)

(52) U.S. Cl.
CPC ............ *B05C 11/042* (2013.01); *B05C 19/04* (2013.01)

(58) Field of Classification Search
CPC ..... B05C 11/04; B05C 11/041; B05C 11/042; B05C 11/044; B05C 11/045; B05C 11/047; B05C 11/048
See application file for complete search history.

(56) References Cited

U.S. PATENT DOCUMENTS

2012/0047671 A1 3/2012 Park et al.
2016/0043382 A1 2/2016 Tanihara et al.
(Continued)

FOREIGN PATENT DOCUMENTS

JP 09-216338 8/1997
JP 2010-184359 8/2010
(Continued)

OTHER PUBLICATIONS

International Search Report of PCT application No. PCT/JP2022/008949 dated Apr. 12, 2022.

*Primary Examiner* — JaMel M Nelson
(74) *Attorney, Agent, or Firm* — Wenderoth, Lind & Ponack, L.L.P.

(57) ABSTRACT

A powder coating device including: a powder feeder that feeds powder onto a surface of a base material; a squeegee that is disposed to form a gap with respect to the base material and has a surface in contact with the powder fed onto the surface of the base material, the squeegee being configured to adjust a thickness of a powder layer composed of the powder fed onto the surface of the base material by the powder feeder and move relative to the base material in a state where an inclination angle of the surface of the squeegee with respect to a normal direction of the surface of the base material is changeable; a powder inclination angle detector that detects an angle between a surface of the powder layer and the base material; anda first controller that adjusts the inclination angle of the surface of the squeegee in contact with the powder based on the inclination angle of the powder layer detected by the powder inclination angle detector.

6 Claims, 12 Drawing Sheets

(56) References Cited

U.S. PATENT DOCUMENTS

| | | | |
|---|---|---|---|
| 2016/0056493 | A1 | 2/2016 | Umeda et al. |
| 2016/0181651 | A1 | 6/2016 | Tanihara et al. |

FOREIGN PATENT DOCUMENTS

| | | | |
|---|---|---|---|
| JP | 2011-216504 | 10/2011 | |
| JP | 2012-049488 | 3/2012 | |
| JP | 2014-186969 | 10/2014 | |
| JP | 2014-198293 | 10/2014 | |
| JP | 2016-119207 | 6/2016 | |
| WO | 2014/155168 | 10/2014 | |
| WO | WO-2016111137 A1 * | 7/2016 | .......... H01M 4/0409 |

* cited by examiner

FIG. 15

TABLE 1

| No. | ITEM | 10 | | 30 | |
|---|---|---|---|---|---|
| | | COATING CONTINUITY | FILM THICKNESS VARIATION | COATING CONTINUITY | FILM THICKNESS VARIATION |
| EXPERIMENTAL EXAMPLE 1 | FIRST EXEMPLARY EMBODIMENT | A | B | A | B |
| EXPERIMENTAL EXAMPLE 2 | SECOND EXEMPLARY EMBODIMENT | A | B | A | B |
| EXPERIMENTAL EXAMPLE 3 | THIRD EXEMPLARY EMBODIMENT | A | A | A | B |
| EXPERIMENTAL EXAMPLE 4 | FOURTH EXEMPLARY EMBODIMENT | A | A | A | B |
| EXPERIMENTAL EXAMPLE 5 | FIFTH EXEMPLARY EMBODIMENT | A | A | A | A |
| EXPERIMENTAL EXAMPLE 6 | SIXTH EXEMPLARY EMBODIMENT | A | A | A | A |
| COMPARATIVE EXAMPLE 1 | | C | - | - | - |
| COMPARATIVE EXAMPLE 2 | | C | - | - | - |
| COMPARATIVE EXAMPLE 3 | | C | - | - | - |

POWDER COATING DEVICE

TECHNICAL FIELD

The present disclosure relates to a powder coating device.

BACKGROUND ART

Conventionally, a technique of applying a powder onto a surface of a member such as a metal foil while conveying the member is widely known.

For example, PTL 1 discloses a technique of applying a composite material (powder) containing an active material onto a surface of a current collector that is an elongated metal foil.

In addition, PTL 2 discloses a method of applying vibration at a frequency of about 700 Hz to a cylindrical squeegee to suppress stagnation of powder.

CITATION LIST

Patent Literatures

PTL 1: Unexamined Japanese Patent Publication No. 2011-216504
PTL 2: Unexamined Japanese Patent Publication No. 2014-198293

SUMMARY OF THE INVENTION

A powder coating device according to one aspect of the present disclosure includes: a powder feeder that feeds powder onto a surface of a base material; a squeegee that is disposed to form a gap with respect to the base material and has a surface in contact with the powder fed onto the surface of the base material, the squeegee being configured to adjust a thickness of a powder layer composed of the powder fed onto the surface of the base material by the powder feeder and move relative to the base material in a state where an inclination angle of the surface of the squeegee with respect to a normal direction of the surface of the base material is changeable; a powder inclination angle detector that detects an angle between a surface of the powder layer and the base material; anda first controller that adjusts the inclination angle of the surface of the squeegee in contact with the powder on the basis of the inclination angle of the powder layer detected by the powder inclination angle detector.

BRIEF DESCRIPTION OF THE DRAWINGS

FIG. 15 shows Table 1 showing results of each exemplary embodiment according to the present disclosure (Experimental Example 1 to 6) and results of Comparative Examples according to the prior art.

DESCRIPTION OF EMBODIMENT

Figure 9:
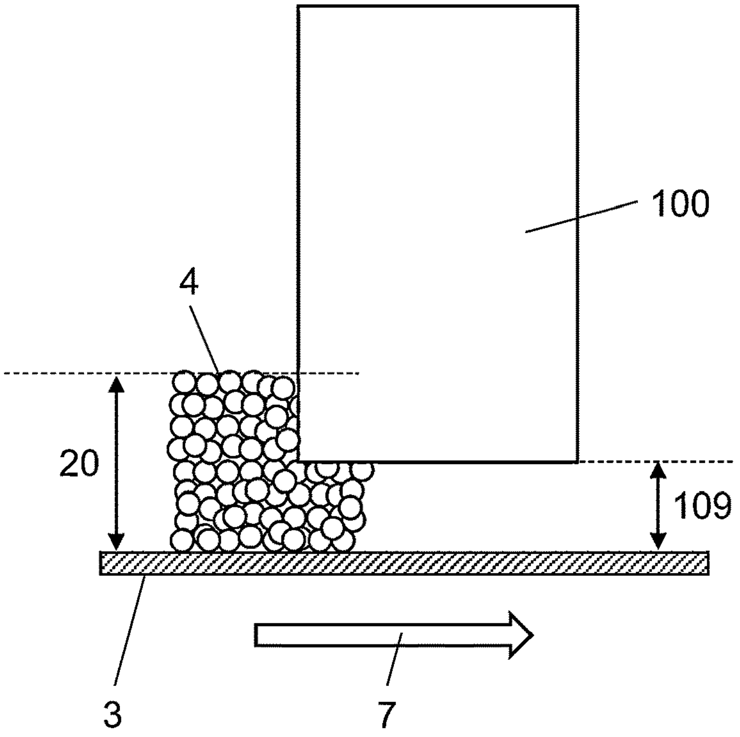
FIG. 9 is a diagram illustrating a state immediately after the start of uniform adjustment of the thickness of a powder layer composed of a powder by a blade-shaped squeegee in the prior art.
Figure 10:
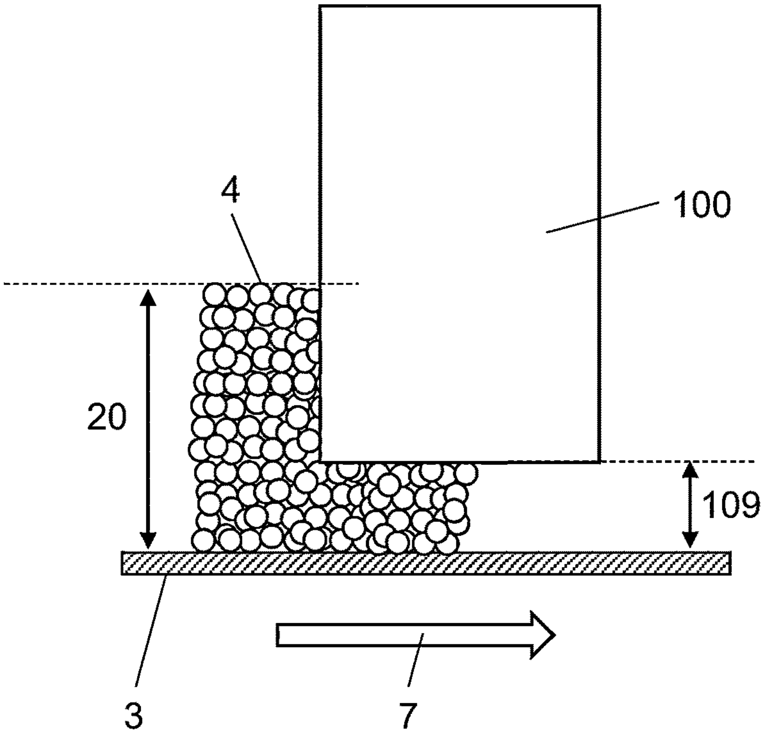
FIG. 10 is a diagram illustrating a state after a predetermined time after the start of uniform adjustment of the thickness of a powder layer composed of a powder by a blade-shaped squeegee in the prior art.

FIGS. 9 and 10 are schematic views of the prior art using blade-shaped squeegee 100 described in PTL 1.

Here, FIG. 9 illustrates a state immediately after the start of uniform adjustment of the thickness of a powder layer composed of powder 4 by blade-shaped squeegee 100, and FIG. 10 illustrates a state after a predetermined time.

PTL 1 describes, as shown in FIG. 9, that powder 4 is fed onto a surface of a metal foil as base material 3, and then powder 4 is leveled by blade-shaped squeegee 100 to uniformly adjust a thickness of a powder layer.

However, when the fluidity of powder 4 is poor, as shown in FIG. 10, it is not possible to promote the entry of powder 4 into the gap between squeegee 100 and base material 3, and powder 4 stagnates (powder accumulation height 20 increases) on the upstream side in relative movement direction 7 of base material 3 (metal foil) with respect to squeegee 100, and a bridge is generated between squeegee 100 and base material 3 (metal foil), whereby it has been difficult to realize continuous film formation with high accuracy.

FIGS. 11 to 14 show schematic views of the prior art for vibrating cylindrical squeegee 150 described in PTL 2.

Figure 11:
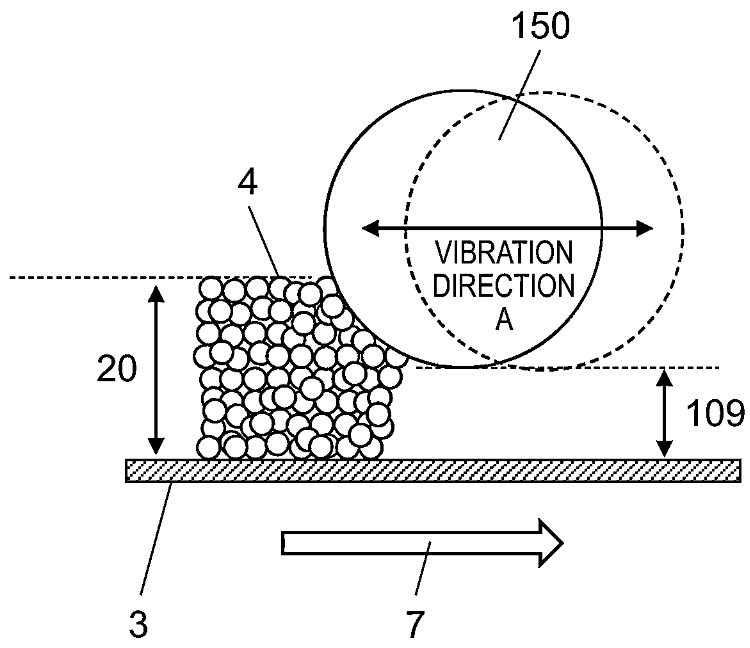
FIG. 11 is a diagram illustrating a state immediately after the start in a case where the thickness of the powder layer composed of the powder is adjusted by vibrating a cylindrical squeegee in relative movement direction 7 of the base material with respect to the squeegee and an opposite direction (vibration direction A in FIG. 11) while maintaining the shortest distance between the squeegee and the base material in the prior art.
Figure 12:
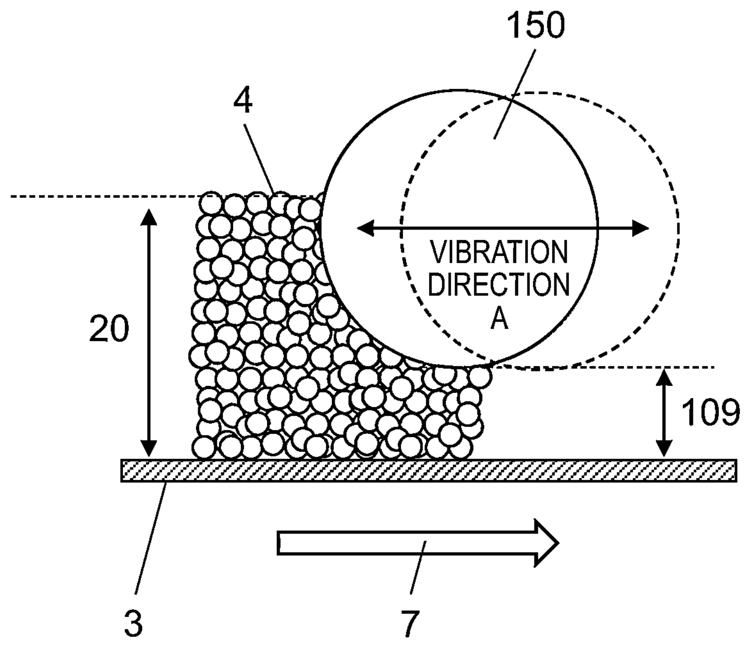
FIG. 12 is a diagram illustrating a state after a predetermined time after the start in a case where the thickness of the powder layer composed of the powder is adjusted by vibrating a cylindrical squeegee in relative movement direction 7 of the base material with respect to the squeegee and an opposite direction (vibration direction A in FIG. 11) while maintaining the shortest distance between the squeegee and the base material in the prior art.

Here, FIG. 11 illustrates a state immediately after the start in a case where the thickness of the powder layer composed of powder 4 is adjusted by vibrating cylindrical squeegee 150 in relative movement direction 7 of base material 3 with respect to squeegee 150 and an opposite direction (vibration direction A in FIG. 11) while maintaining shortest distance 109 between squeegee 150 and base material 3, and FIG. 12 illustrates a state after a predetermined time.

Figure 13:
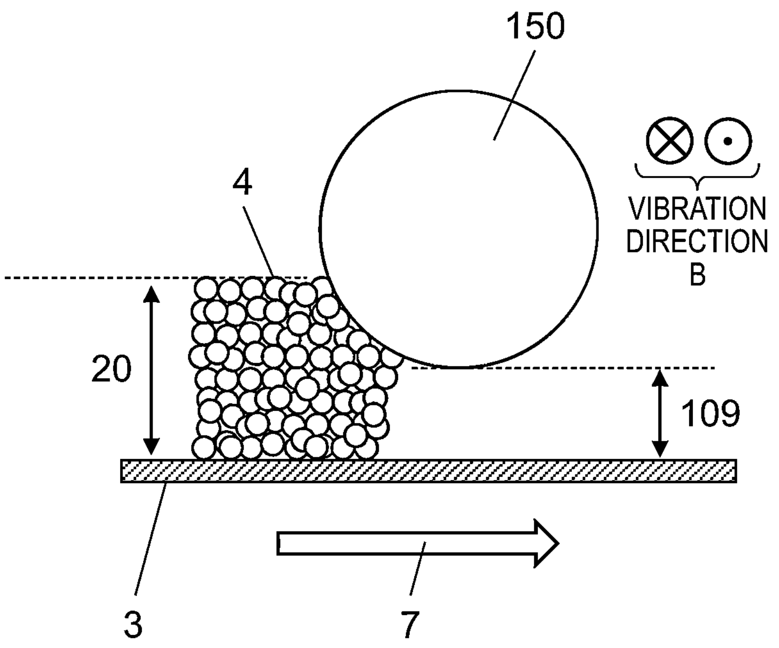
FIG. 13 is a diagram illustrating a state immediately after the start in a case where the thickness of the powder layer composed of the powder is adjusted by vibrating a cylindrical squeegee in a direction perpendicular to the relative movement direction of the base material with respect to the squeegee (vibration direction B in FIG. 13) while maintaining the shortest distance between the squeegee and the base material in the prior art.
Figure 14:
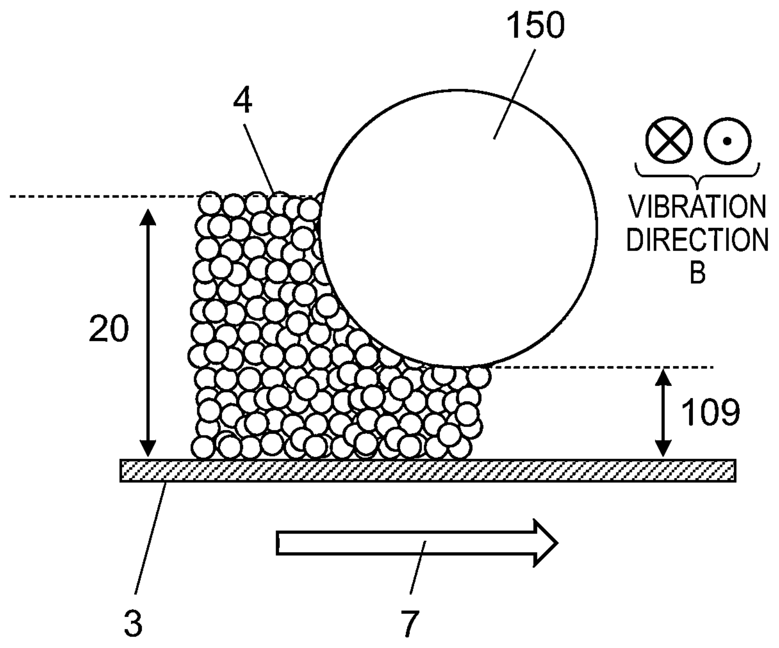
FIG. 14 is a diagram illustrating a state after a predetermined time after the start in a case where the thickness of the powder layer composed of the powder is adjusted by vibrating a cylindrical squeegee in a direction perpendicular to the relative movement direction of the base material with respect to the squeegee (vibration direction B in FIG. 13) while maintaining the shortest distance between the squeegee and the base material in the prior art.

Meanwhile, FIG. 13 illustrates a state immediately after the start in a case where the thickness of the powder layer composed of powder 4 is adjusted by vibrating cylindrical squeegee 150 in a direction perpendicular to relative movement direction 7 of base material 3 with respect to squeegee 150 (vibration direction B in FIG. 13) while maintaining shortest distance 109 between squeegee 150 and base material 3 in the prior art, and FIG. 14 illustrates a state after a predetermined time.

As shown in FIGS. 11 to 12, PTL 2 describes that powder 4 is fed onto a surface of a metal foil as base material 3, and then the thickness of the powder layer is uniformly adjusted by vibrating cylindrical squeegee 150 and leveling powder 4 in relative movement direction 7 of base material 3 with respect to squeegee 150 and an opposite direction (vibration direction A in FIG. 11) while adjusting squeegee 150 to maintain shortest distance 109 between squeegee 150 and base material 3.

However, when the fluidity of powder 4 is poor, as shown in FIG. 12, it is not possible to promote the entry of powder 4 into the gap between squeegee 150 and base material 3, and powder 4 stagnates (powder accumulation height 20 increases) on the upstream side in relative movement direction 7 of base material 3 (metal foil) with respect to squeegee 150, and a bridge is generated between squeegee 150 and base material 3 (metal foil), whereby it has been difficult to realize continuous film formation with high accuracy.

In addition, as shown in FIGS. 13 to 14, PTL 2 describes that powder 4 is fed onto a surface of a metal foil as base material 3, and then the thickness of the powder layer is uniformly adjusted by vibrating cylindrical squeegee 150 and leveling powder 4 in a direction perpendicular to relative movement direction 7 of base material 3 with respect to squeegee 150 (vibration direction B in FIG. 13) while maintaining shortest distance 109 between squeegee 150 and base material 3.

However, when the fluidity of powder 4 is poor, as shown in FIG. 14, it is not possible to promote the entry of powder 4 into the gap between squeegee 150 and base material 3, and powder 4 stagnates (powder accumulation height 20 increases) on the upstream side in relative movement direction 7 of base material 3 (metal foil) with respect to squeegee 150, and a bridge is generated between squeegee 150 and base material 3 (metal foil), whereby it has been difficult to realize continuous film formation with high accuracy.

In recent years, in a situation where it has been required to achieve both higher performance and lower cost of devices, for example, there is a demand for a technique of directly and precisely forming a film of powder 4 of a functional powder material having a particle diameter of several tens of μm to sub-μm, which is much smaller, easily aggregated, and has lower fluidity than the conventional one, without undergoing a step such as granulation. However, in the prior art, the effect of suppressing the stagnation and the occurrence of bridges of powder 4 that has a small particle size, is easily aggregated, and has lower fluidity is not sufficient, and it is difficult to level the powder layer so that the thickness of the powder layer becomes uniform.

Therefore, an object of the present disclosure is to provide a powder coating device capable of forming a powder layer with less film thickness variation on the surface of base material 3.

Hereinafter, the exemplary embodiments of the present disclosure will be described with reference to the drawings.

Note that the exemplary embodiments described below are intended to provide comprehensive or specific examples of the present disclosure. Numerical values, shapes, materials, components, arrangement positions and connection modes of the components, steps, an order of the steps, and the like shown in the following exemplary embodiment are examples only, and are not intended to limit the present disclosure. In addition, of constituent elements in the following exemplary embodiment, constituent elements that are not recited in the independent claims will be described as optional constituent elements.

Each of the drawings is a schematic view, and is not necessarily precisely illustrated. In the drawings, identical reference marks are given to the identical elements.

In addition, exemplary embodiments will be described below with reference to the drawings as appropriate, but detailed description more than necessary may be omitted. For example, a detailed description of well-known matters and a duplicate description of substantially identical configurations may be omitted. This is to avoid an unnecessarily redundant description below and to facilitate understanding of a person skilled in the art.

First Exemplary Embodiment

Figure 1:
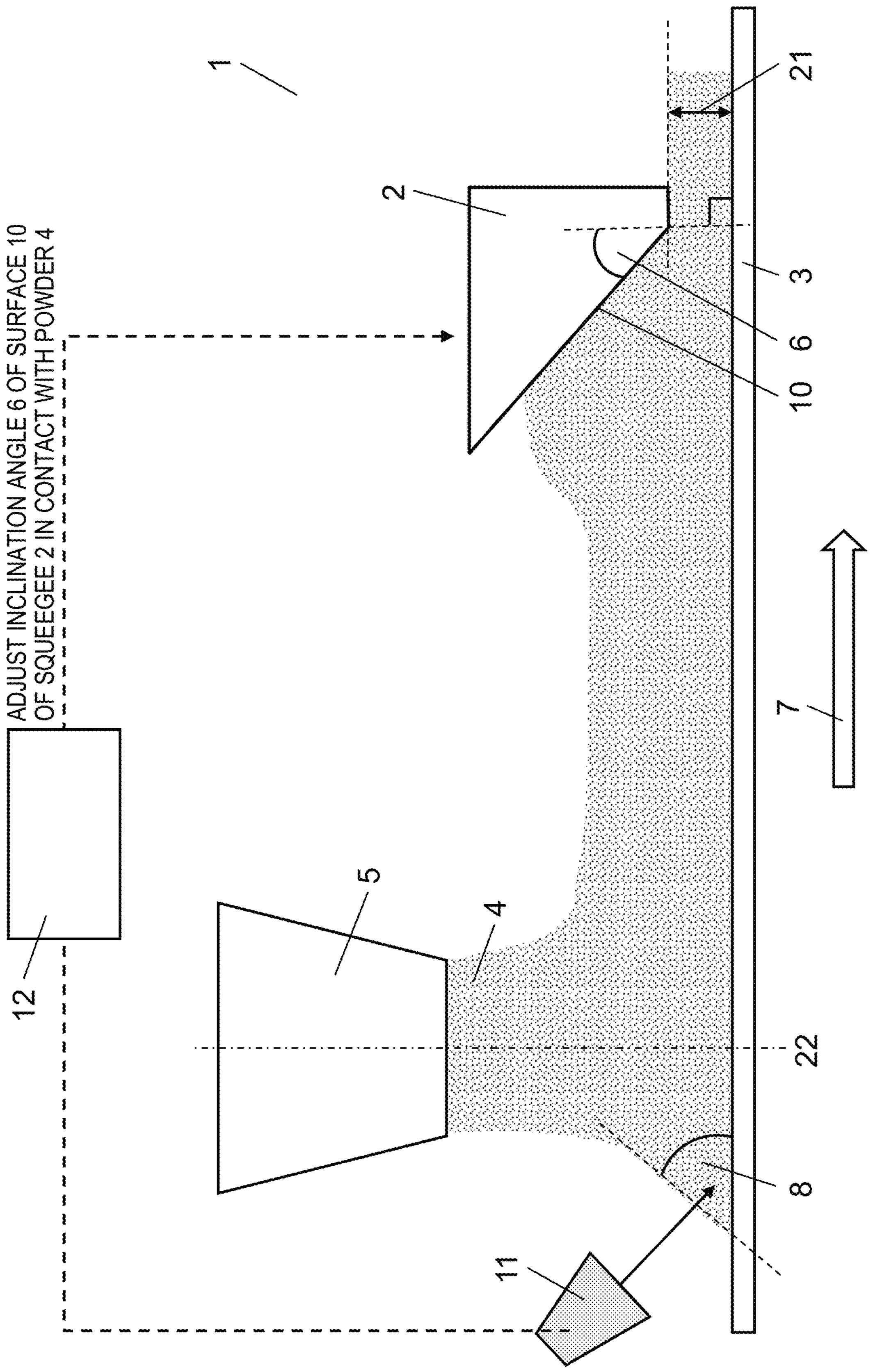
FIG. 1 is a schematic view illustrating a powder coating device according to an exemplary embodiment (first exemplary embodiment) of the present disclosure.

FIG. 1 is a schematic view of powder coating device 1 according to an exemplary embodiment of the present disclosure.

As shown in FIG. 1, powder coating device 1 of the present disclosure includes: powder feeder 5 that feeds powder 4 onto a surface of base material 3; squeegee 2 that is disposed to form a gap with respect to base material 3, adjusts a thickness of a powder layer composed of powder 4 fed onto the surface of base material 3 by powder feeder 5, and scans the surface of base material 3 in a state where inclination angle 6 of surface 10 in contact with powder 4 is changeable; a drive unit that is not illustrated and relatively moves base material 3 and squeegee 2 in a certain direction; and first controller 12 that causes powder inclination angle detector 11 to detect angle 8 between a surface of a powder layer composed of powder 4 fed from powder feeder 5 to base material 3 and base material 3 on an upstream side of powder feeding position 22 in relative movement direction 7 of base material 3 with respect to squeegee 2, and adjusts inclination angle 6 of surface 10 of squeegee 2 in contact with powder 4 with respect to a normal direction of the surface of base material 3 based on the inclination angle of the powder layer detected by powder inclination angle detector 11. Here, being in contact with powder 4 includes a case where at least a part of surface 10 of squeegee 2 is in contact with or substantially in contact with powder 4.

Powder 4 may be any powdery substance. For example, in the present exemplary embodiment, a group of particles containing an active material having an average particle diameter (D50) from 0.005 μm to 50 μm inclusive can be used as powder 4. The average particle diameter (D50) is a volume-based median diameter calculated from a measured value of a particle size distribution by a laser diffraction scattering method, and can be measured using a commercially available laser analysis scattering type particle size distribution measurement device.

Powder inclination angle detector 11 is disposed on at least one of an upstream side and a downstream side in a relative movement direction 7 of base material 3 with respect to squeegee 2 with respect to powder feeding position 22, and detects angle 8 between the surface of the powder layer composed of powder 4 fed to base material 3 and base material 3. In the present exemplary embodiment, powder inclination angle detector 11 is disposed on an upstream side of powder feeding position 22 in relative movement direction 7 of base material 3 with respect to squeegee 2. Powder inclination angle detector 11 may be any detector that can detect angle 8 between the surface of the powder layer composed of powder 4 fed from powder feeder 5 to base material 3 and base material 3. For example, powder inclination angle detector 11 may capture an image taken by a camera, which is not illustrated, from a direction perpendicular to relative movement direction 7 of base material 3 (the front side of the sheet of FIG. 1), capture the position of the surface of the powder layer composed of powder 4 fed onto base material 3 by image processing such as binarization processing, and detect angle 8 between the surface of the powder layer composed of powder 4 fed onto base material 3 and base material 3. In addition, powder inclination angle detector 11 may capture an image of the shadow of powder 4 fed onto base material 3 cast by a light source with the camera, capture the position of the surface of the powder layer composed of powder 4 fed onto base material 3 by image processing such as binarization processing, and detect angle 8 between the surface of the powder layer composed of powder 4 fed onto base material 3 and base material 3. Here, angle 8 between the surface of the powder layer composed of powder 4 fed onto base material 3 and base material 3 is, for example, a right angle or an acute angle between the surface of base material 3 and the surface of the powder layer at a boundary portion between the powder layer and base material 3.

Here, for example, in powder 4 having a very small particle diameter of several tens of μm to sub-μm, aggregation proceeds in a stationary state, and the decrease in fluidity of powder 4 is promoted. Under such circumstances, in general, the fluidity of powder 4 is determined in advance by measuring the material physical properties such as a repose angle of powder 4 before charging powder 4 into powder coating device 1. After confirming that the measured value is within a predetermined range, powder 4 is charged into powder coating device 1. However, in an actual production process, there are a number of circumstances where production is continued while repeating the start and stop of coating, or coating is started again after stopping for a certain period of time during production due to equipment trouble or the like. Under such circumstances, at the time of stopping the coating, powder 4 charged into powder coating device 1 is in a stationary state in powder feeder 5 and in a pipe path, which is not illustrated, leading to powder feeder 5, so that the aggregation of powder 4 may proceed, and the decrease in fluidity of powder 4 may be promoted.

As a result, at the time of leveling by squeegee 2 in order to form a powder layer with less film thickness variation, the fluidity of powder 4 in a state of being fed onto base material 3 is different between immediately before leveling by squeegee 2 and the time point confirmed before charging to powder coating device 1.

Here, in the prior art, the configuration condition of squeegee 2 (inclination angle 6 of surface 10 of squeegee 2 in contact with powder 4) that affects the variation in the film thickness of the powder layer after the treatment is set on the basis of the fluidity determined before charging powder coating device 1. For this reason, when powder 4 is agglomerated in powder feeder 5 and in a pipe path, which is not illustrated, leading to powder feeder 5 after powder 4 is charged into powder coating device 1, and the fluidity is changed, it is difficult to perform accurate coating with little film thickness variation continuously and stably.

On the other hand, powder coating device 1 according to an exemplary embodiment of the present disclosure includes first controller 12 that detects angle 8 between the surface of the powder layer composed of powder 4 and base material 3 by powder inclination angle detector 11 on the upstream side in relative movement direction 7 of base material 3 with respect to squeegee 2 with respect to powder feeding position 22 and adjusts inclination angle 6 of surface 10 of squeegee 2 in contact with powder 4. Therefore, in powder coating device 1, at the time of leveling with squeegee 2 to form a powder layer with less film thickness variation, it is possible to comprehend the fluidity of powder 4 in the state of being fed onto base material 3 immediately before leveling with squeegee 2 and to set the configuration condition of squeegee 2 (inclination angle 6 of surface 10 of squeegee 2 in contact with powder 4) based on the flowability. In addition, even when the fluidity of powder 4 changes while the production is continued, the configuration condition of squeegee 2 (inclination angle 6 of surface 10 of squeegee 2 in contact with powder 4) can be adjusted according to the change.

Here, inclination angle 6 of surface 10 of squeegee 2 in contact with powder 4 is particularly desirably an angle greater than or equal to angle 8 between the surface of the powder layer composed of powder 4 and base material 3 on the upstream side in relative movement direction 7 of base material 3 with respect to powder feeding position 22 detected by powder inclination angle detector 11.

Figure 7A:
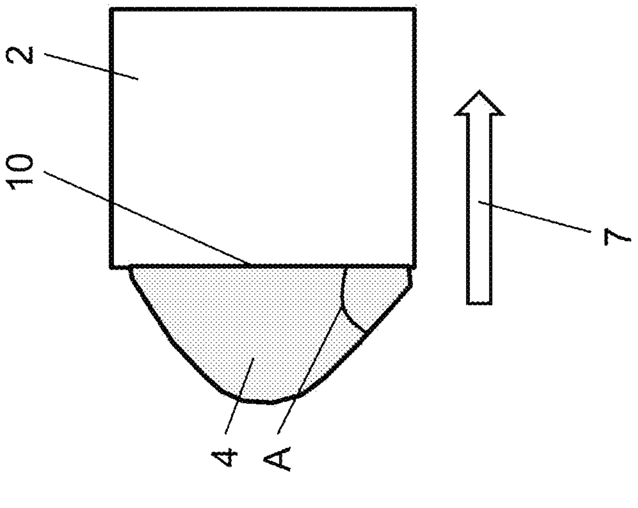
FIG. 7A is a diagram illustrating a relationship between a repose angle of powder and an inclination angle of a surface of a squeegee in contact with the powder.
Figure 7B:
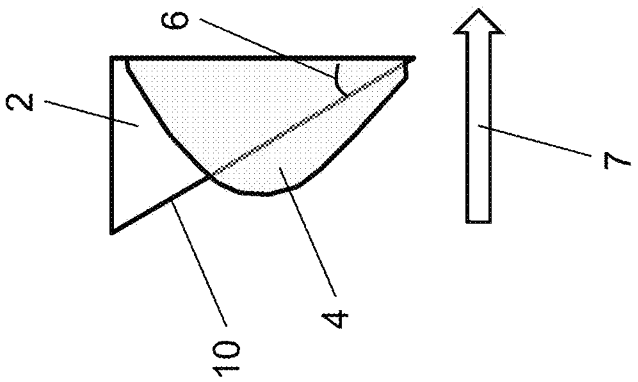
FIG. 7B is a diagram illustrating a relationship between a repose angle of powder and an inclination angle of a surface of a squeegee in contact with the powder.
Figure 7C:
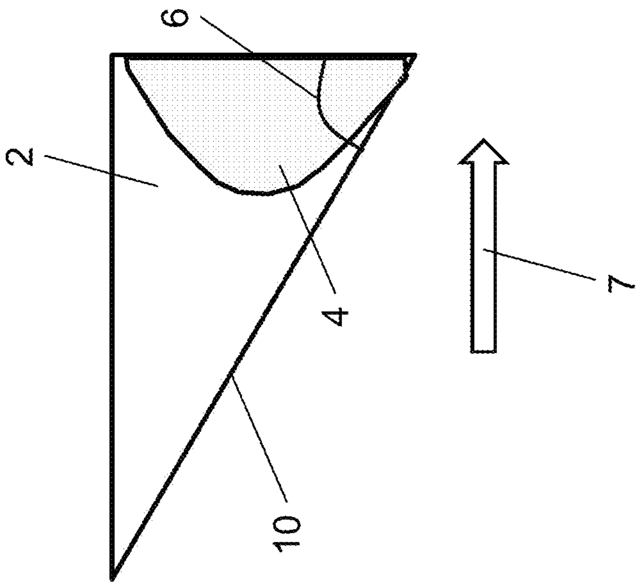
FIG. 7C is a diagram illustrating a relationship between a repose angle of powder and an inclination angle of a surface of a squeegee in contact with the powder.

FIGS. 7A to 7C illustrate a relationship between a repose angle of powder 4 and inclination angle 6 of surface 10 of squeegee 2 in contact with powder 4.

Here, FIG. 7A is a diagram illustrating a case where inclination angle 6 of surface 10 of squeegee 2 in contact with powder 4 is 0°, FIG. 7B is a diagram illustrating a case where inclination angle 6 of surface 10 of squeegee 2 in contact with powder 4 is greater than 0° and smaller than the repose angle of powder 4, and FIG. 7C is a diagram illustrating a case where inclination angle 6 of surface 10 of squeegee 2 in contact with powder 4 is greater than the repose angle of powder 4.

As shown in FIG. 7A, repose angle A is an angle between a slope of a mound of powder 4 to be formed and a horizontal plane when powder 4 is dropped onto, for example, the base material from a certain height and powder 4 is kept stable in a mound shape without spontaneously collapsing.

Here, when the powder layer composed of powder 4 fed onto base material 3 is leveled with squeegee 2, powder 4 is conveyed in relative movement direction 7 of base material 3. Therefore, the upstream side and the downstream side in relative movement direction 7 of base material 3 are considered as an upper side and a lower side, respectively, and it may be considered that the same behavior as dropping powder 4 toward surface 10 of squeegee 2 in contact with powder 4 from the upper side to the lower side occurs.

As a result, in a case where inclination angle 6 of surface 10 of squeegee 2 in contact with powder 4 is 0°, as illustrated in FIG. 7A, in a case where the repose angle of powder 4 is A, powder 4 that has reached surface 10 of squeegee 2 in contact with powder 4 is less likely to collapse, whereby powder 4 is likely to stagnate.

In addition, in a case where inclination angle 6 of surface 10 of squeegee 2 in contact with powder 4 is greater than 0° and smaller than repose angle A of powder 4, as illustrated in FIG. 7B, powder 4 that has reached surface 10 of squeegee 2 in contact with powder 4 can be promoted to enter the gap between squeegee 2 and base material 3 by the inclination of surface 10 of squeegee 2 in contact with powder 4, so that the stagnation of powder 4 can be suppressed.

In addition, in a case where inclination angle 6 of surface 10 of squeegee 2 in contact with powder 4 is greater than repose angle A of powder 4, as illustrated in FIG. 7C, powder 4 that has reached surface 10 of squeegee 2 in contact with powder 4 can have a very small force to stay on surface 10 of squeegee 2 in contact with powder 4. Therefore, an effect of greatly promoting powder 4 to enter the gap between squeegee 2 and base material 3 can be obtained, so that an extremely great stagnation suppressing effect of powder 4 can be obtained.

Here, angle 8 between the surface of the powder layer composed of powder 4 fed from powder feeder 5 to base material 3 and base material 3 on the upstream side in relative movement direction 7 of base material 3 with respect to powder feeding position 22 detected by powder inclination angle detector 11 means the repose angle of powder 4 in the state of being fed onto base material 3, and is an index representing the fluidity of powder 4. Given this, while the production is continued, powder coating device 1 comprehends angle 8 between the surface of the powder layer composed of powder 4 fed from powder feeder 5 to base material 3 and base material 3 on the upstream side in relative movement direction 7 of base material 3 with respect to powder feeding position 22, and adjusts inclination angle 6 of surface 10 of squeegee 2 in contact with powder 4 accordingly. In particular, in powder coating device 1, by setting the angle between the surface of the powder layer composed of powder 4 fed from powder feeder 5 to base material 3 and base material 3 to be greater than or equal to angle 8 on the upstream side in relative movement direction 7 of base material 3 with respect to powder feeding position 22, it is possible to obtain an extremely great stagnation suppressing effect of powder 4, whereby it is possible to perform precise coating with little film thickness variation continuously and stably.

Second Exemplary Embodiment

Figure 2:
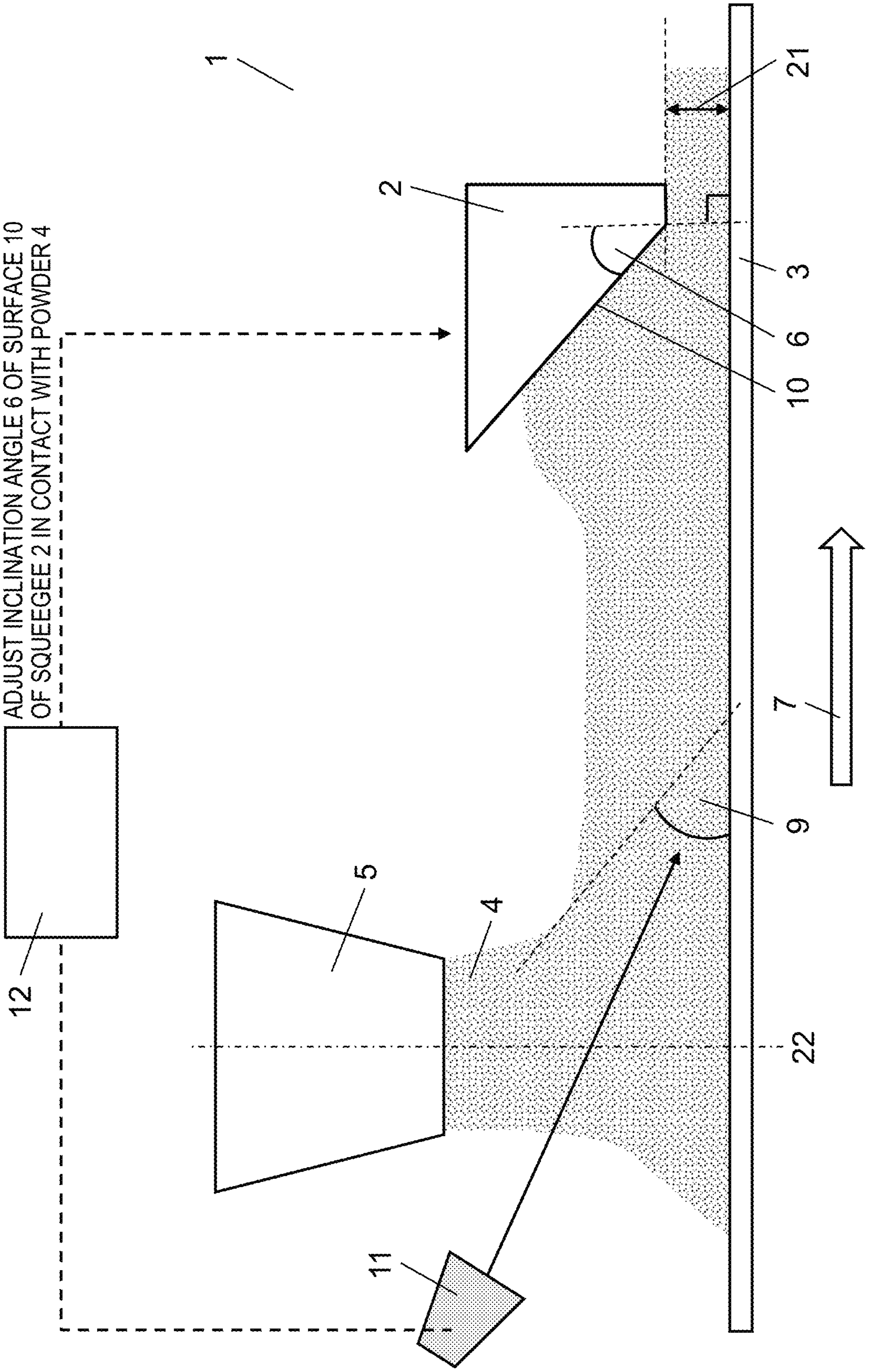
FIG. 2 is a schematic view illustrating a powder coating device according to an exemplary embodiment (second exemplary embodiment) of the present disclosure.

FIG. 2 is a schematic view of powder coating device 1 according to an exemplary embodiment of the present disclosure.

Powder coating device 1 of the present disclosure has the same basic configuration as the first exemplary embodiment except that powder inclination angle detector 11 is disposed on the downstream side in relative movement direction 7 of base material 3 with respect to squeegee 2 with respect to powder feeding position 22, and powder coating device 1 includes first controller 12 that detects angle 9 between the surface of the powder layer composed of powder 4 fed from powder feeder 5 to base material 3 and base material 3 on the downstream side in relative movement direction 7 of base material 3 with respect to squeegee 2 with respect to powder feeding position 22 by powder inclination angle detector 11 and adjusts inclination angle 6 of surface 10 of squeegee 2 in contact with powder 4. Therefore, description of the basic configuration of powder coating device 1 of the present exemplary embodiment will be omitted as appropriate.

Here, angle 9 between the surface of the powder layer composed of powder 4 fed from powder feeder 5 to base material 3 and base material 3 on the downstream side in relative movement direction 7 of base material 3 with respect to powder feeding position 22 detected by powder inclination angle detector 11 means the repose angle of powder 4 in the state of being fed onto base material 3, and is an index representing the fluidity of powder 4. Given this, while the production is continued, powder coating device 1 comprehends angle 9 between the surface of the powder layer composed of powder 4 fed from powder feeder 5 to base material 3 and base material 3 on the downstream side in relative movement direction 7 of base material 3 with respect to powder feeding position 22, and adjusts inclination angle 6 of surface 10 of squeegee 2 in contact with powder 4 accordingly. In particular, in powder coating device 1, by setting the angle between the surface of the powder layer composed of powder 4 fed from powder feeder 5 to base material 3 and base material 3 to be greater than or equal to angle 9 on the downstream side in relative movement direction 7 of base material 3 with respect to powder feeding position 22, it is possible to obtain an extremely great stagnation suppressing effect of powder 4, whereby it is possible to perform precise coating with little film thickness variation continuously and stably.

Third Exemplary Embodiment

Figure 3:
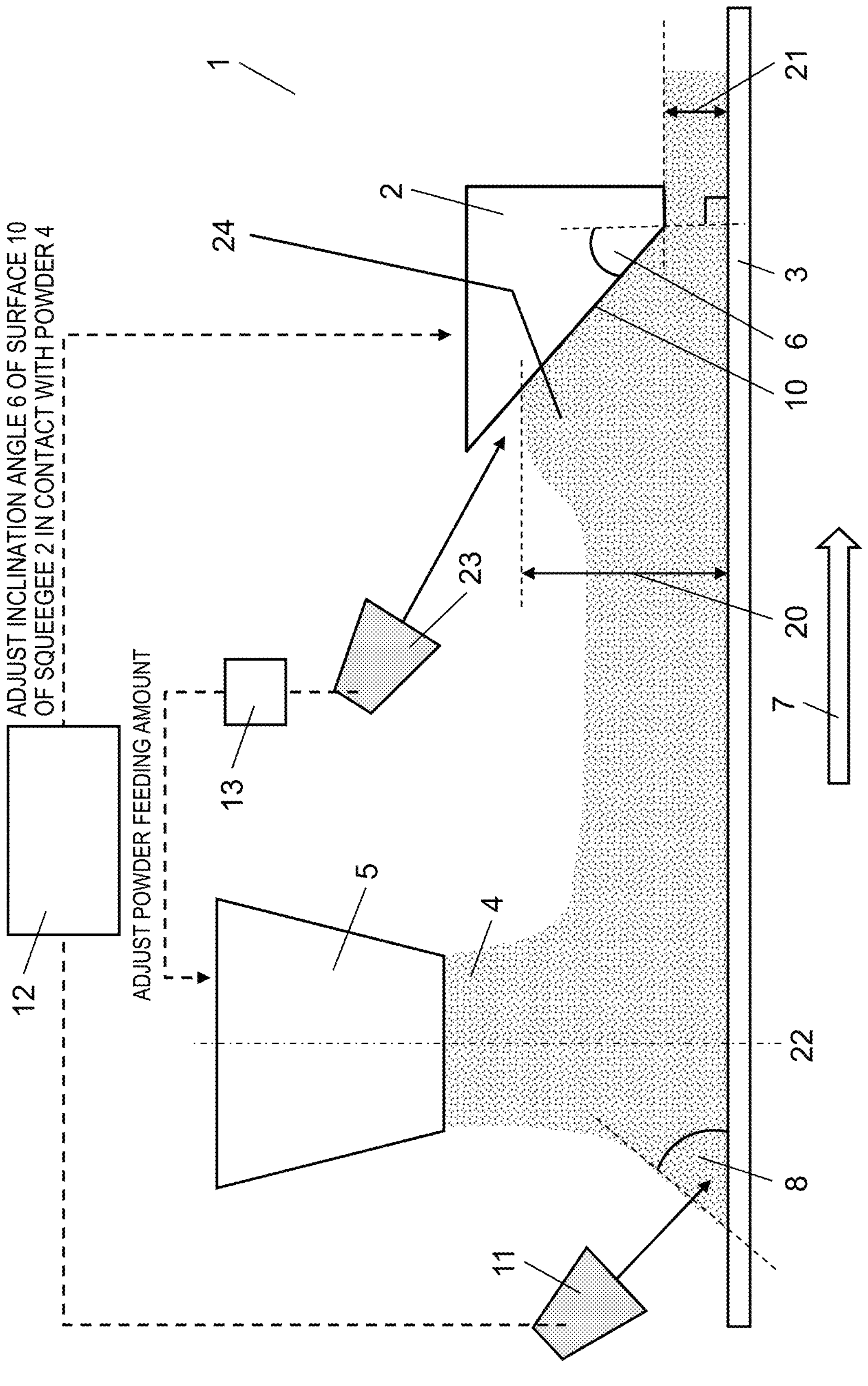
FIG. 3 is a schematic view illustrating a powder coating device according to an exemplary embodiment (third exemplary embodiment) of the present disclosure.

FIG. 3 is a schematic view of powder coating device 1 according to an exemplary embodiment of the present disclosure.

Powder coating device 1 of the present disclosure has the same basic configuration as the first exemplary embodiment except that powder coating device 1 of the present disclosure includes second controller 13 that adjusts the powder feeding amount to base material 3 on the basis of powder accumulation height 20 detected by powder accumulation height detector 23 on surface 10 of squeegee 2 in contact with powder 4 on the upstream side in relative movement direction 7 of base material 3 with respect to squeegee 2, and powder accumulation height detector 23 that detects the height of powder 4 accumulation on surface 10 of squeegee 2 in contact with powder 4 on the upstream side in relative movement direction 7 of base material 3 with respect to squeegee 2. Therefore, description of the basic configuration of powder coating device 1 of the present exemplary embodiment will be omitted as appropriate.

Here, powder accumulation height detector 23 only needs to be able to detect powder accumulation height 20 on surface 10 of squeegee 2 in contact with powder 4 on the upstream side in relative movement direction 7 of base material 3. For example, powder accumulation height detector 23 may capture an image from a direction perpendicular to relative movement direction 7 of base material 3 (the front side of the sheet of FIG. 3) with the camera, capture the position of the surface of the powder accumulation 24 by image processing such as binarization processing, and detect powder accumulation height 20 on surface 10 of squeegee 2 in contact with powder 4 on the upstream side in relative movement direction 7 of base material 3. In addition, powder accumulation height detector 23 may capture an image of a shadow of powder accumulation 24 on surface 10 of squeegee 2 in contact with powder 4 on the upstream side in relative movement direction 7 of base material 3 cast by the light source with the camera, capture the position of the surface of powder accumulation 24 by image processing such as binarization processing, and detect powder accumulation height 20 on surface 10 of squeegee 2 in contact with powder 4 on the upstream side in relative movement direction 7 of base material 3.

Here, ratio Z of powder accumulation height 20 (denoted as A in the following mathematical formula) to distance 21 of the gap between base material 3 and squeegee 2 (denoted as B in the following mathematical formula) is preferably more than 1 and 3 or less. Ratio Z is defined by $Z=A/B$.

When Z is greater than 1 and equal to or smaller than 3, the force applied from squeegee 2 to powder 4 can be reduced, whereby powder 4 is less likely to aggregate and stagnate, and the occurrence of powder clogging can be suppressed.

If powder accumulation height 20 becomes excessively great with Z exceeding 3, the force applied from squeegee 2 to powder 4 becomes too large, whereby powder 4 is likely to aggregate and stagnate, and powder clogging is likely to occur. When Z is 1 or less, the flattening effect cannot be attained.

As described above, powder coating device 1 adjusts inclination angle 6 of surface 10 of squeegee 2 in contact with powder 4 while comprehending angle 8 between the surface of the powder layer composed of powder 4 fed from powder feeder 5 to base material 3 and base material 3 on the upstream side in relative movement direction 7 of base material 3 with respect to powder feeding position 22, and also detects powder accumulation height 20 by powder accumulation height detector 23 on surface 10 of squeegee 2 in contact with powder 4 on the upstream side in relative movement direction 7 of base material 3 with respect to squeegee 2 to adjust the powder feeding amount to base material 3. In particular, in powder coating device 1, ratio Z of powder accumulation height 20 and distance 21 of the gap between base material 3 and squeegee 2 is set to be greater than 1 and 3 or less, so that powder 4 is less likely to aggregate and stagnate in powder coating device 1, and the occurrence of powder clogging can be suppressed, whereby it is possible to perform precise coating with little film thickness variation continuously and stably.

Fourth Exemplary Embodiment

Figure 4:
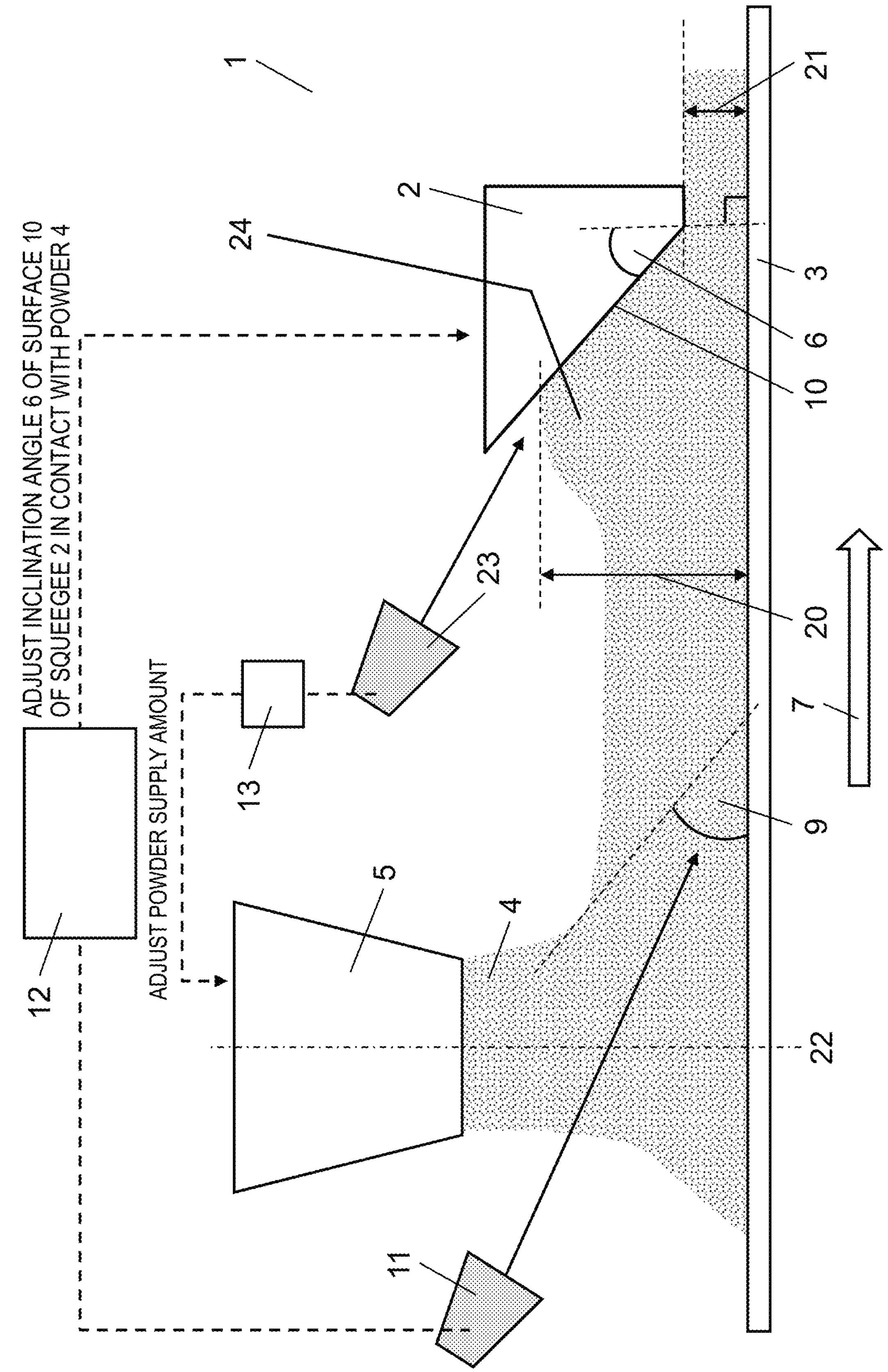
FIG. 4 is a schematic view illustrating a powder coating device according to an exemplary embodiment (fourth exemplary embodiment) of the present disclosure.

FIG. 4 is a schematic view of powder coating device 1 according to an exemplary embodiment of the present disclosure.

Powder coating device 1 of the present disclosure has the same basic configuration as powder coating device 1 of the second exemplary embodiment except that powder accumulation height 20 is detected by powder accumulation height detector 23 on surface 10 of squeegee 2 in contact with powder 4 on the upstream side in relative movement direction 7 of base material 3 with respect to squeegee 2, and powder coating device 1 includes second controller 13 that adjusts the powder feeding amount to base material 3. Therefore, description of the basic configuration of powder coating device 1 of the present exemplary embodiment will be omitted as appropriate.

Here, powder accumulation height detector 23 only needs to be able to detect powder accumulation height 20 on surface 10 of squeegee 2 in contact with powder 4 on the upstream side in relative movement direction 7 of base material 3. Powder accumulation height detector 23 may capture, for example, an image from a direction perpendicular to relative movement direction 7 of base material 3 (the front side of the sheet of FIG. 4) with the camera, capture the position of the surface of powder accumulation 24 by image processing such as binarization processing, and detect powder accumulation height 20 on surface 10 of squeegee 2 in contact with powder 4 on the upstream side in relative movement direction 7 of base material 3. In addition, powder accumulation height detector 23 may capture an image of a shadow of powder accumulation 24 on surface 10 of squeegee 2 in contact with powder 4 on the upstream side in relative movement direction 7 of base material 3 cast by the light source with the camera, capture the position of the surface of powder accumulation 24 by image processing such as binarization processing, and detect powder accumulation height 20 on surface 10 of squeegee 2 in contact with powder 4 on the upstream side in relative movement direction 7 of base material 3.

Here, ratio Z of powder accumulation height 20 to distance 21 of the gap between base material 3 and squeegee 2 is preferably more than 1 and 3 or less.

When Z is greater than 1 and equal to or smaller than 3, the force applied from squeegee 2 to powder 4 can be reduced, whereby powder 4 is less likely to aggregate and stagnate, and the occurrence of powder clogging can be suppressed. If powder accumulation height 20 becomes excessively great with Z exceeding 3, the force applied from squeegee 2 to powder 4 becomes too large, whereby powder 4 is likely to aggregate and stagnate, and powder clogging is likely to occur. When Z is 1 or less, the flattening effect cannot be attained.

As described above, powder coating device 1 adjusts inclination angle 6 of surface 10 of squeegee 2 in contact with powder 4 while comprehending angle 9 between the surface of the powder layer composed of powder 4 fed from powder feeder 5 to base material 3 and base material 3 on the downstream side in relative movement direction 7 of base material 3 with respect to powder feeding position 22, and also detects powder accumulation height 20 by powder accumulation height detector 23 on surface 10 of squeegee 2 in contact with powder 4 on the upstream side in relative movement direction 7 of base material 3 with respect to squeegee 2 to adjust the powder feeding amount to base material 3. In particular, in powder coating device 1, ratio Z of powder accumulation height 20 and distance 21 of the gap between base material 3 and squeegee 2 is set to be greater than 1 and 3 or less, so that powder 4 is less likely to aggregate and stagnate, and the occurrence of powder clogging can be suppressed, whereby it is possible to perform precise coating with little film thickness variation continuously and stably.

Fifth Exemplary Embodiment

Figure 5:
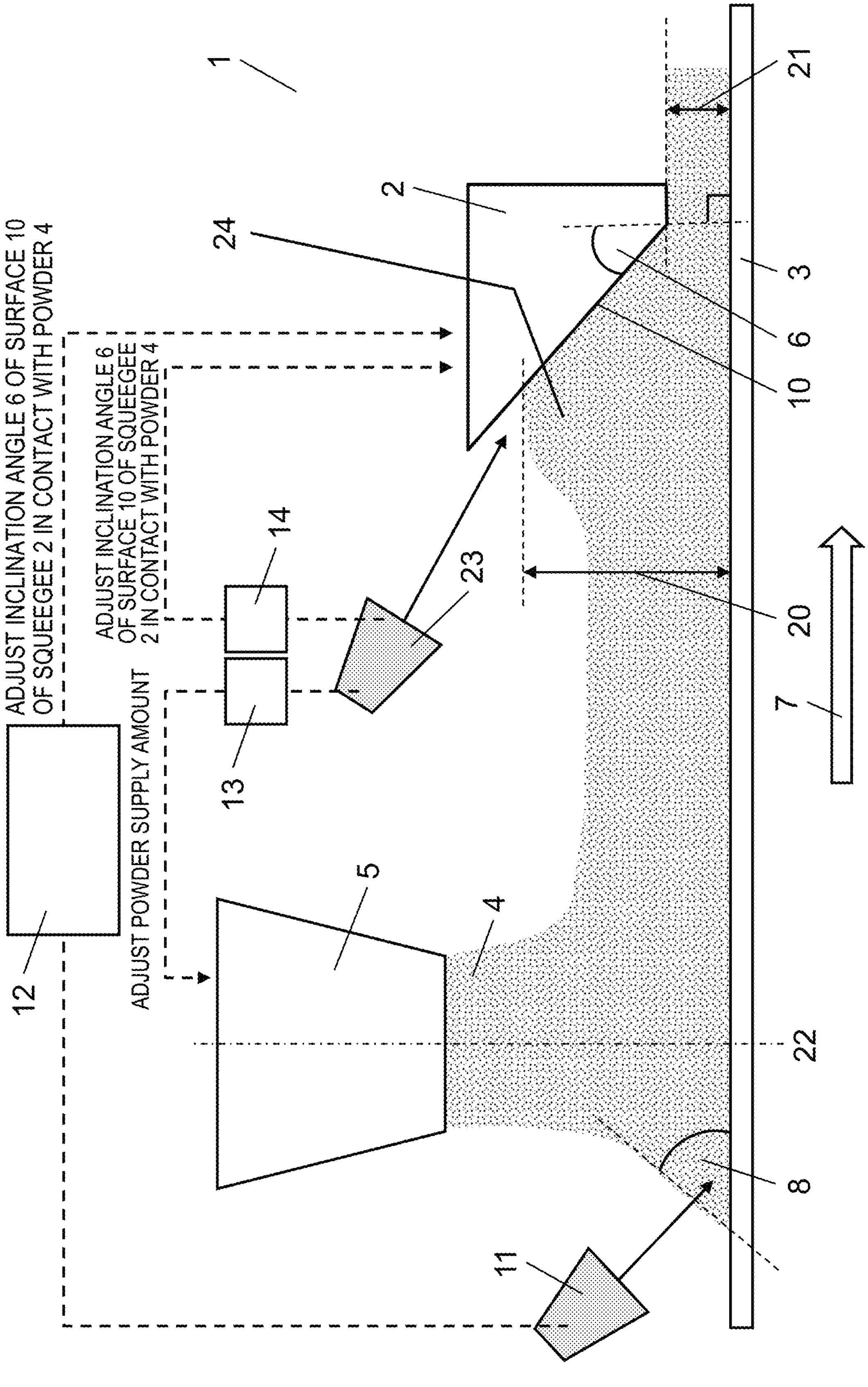
FIG. 5 is a schematic view illustrating a powder coating device according to an exemplary embodiment (fifth exemplary embodiment) of the present disclosure.

FIG. 5 is a schematic view of powder coating device 1 according to an exemplary embodiment of the present disclosure.

Powder coating device 1 of the present disclosure has the same basic configuration as powder coating device 1 of exemplary embodiment 3 except that powder accumulation height 20 is detected by powder accumulation height detector 23 on surface of squeegee 2 in contact with powder 4 on the upstream side in relative movement direction 7 of base material 3 with respect to squeegee 2, and powder coating device 1 includes the third controller 14 that adjusts inclination angle 6 of surface 10 of squeegee 2 in contact with powder 4. Therefore, description of the basic configuration of powder coating device 1 of the present exemplary embodiment will be omitted as appropriate.

Powder coating device 1 detects powder accumulation height 20 by powder accumulation height detector 23 on surface 10 of squeegee 2 in contact with powder 4 on the upstream side in relative movement direction 7 of base material 3 with respect to squeegee 2, and adjusts inclination angle 6 of surface 10 of squeegee 2 in contact with powder 4 in addition to adjusting the powder feeding amount to base material 3. Given this, in powder coating device 1, ratio Z of powder accumulation height 20 and distance 21 of the gap between base material 3 and squeegee 2 can be easily controlled to a desired range. In particular, by setting Z to a range of greater than 1 and 3 or less, powder 4 is less likely to aggregate and stagnate, and the occurrence of powder clogging can be suppressed, whereby it is possible to perform precise coating with little film thickness variation continuously and stably.

For example, in a case where powder accumulation 24 becomes large and powder accumulation height 20 increases whereby Z approaches 3 while the production is continued, powder coating device 1 first decreases the powder feeding amount. If it is desired to further obtain the effect of suppressing the increase in powder accumulation height 20 in this situation, it is preferable to perform adjustment to increase inclination angle 6 of surface 10 of squeegee 2 in contact with powder 4. With this adjustment, powder coating device 1 can obtain an effect of promoting entry of powder 4 into the gap between base material 3 and squeegee 2, thereby obtaining an effect of further suppressing an increase in powder accumulation height 20.

Alternatively, for example, powder accumulation height 20 may be detected by powder accumulation height detector 23 on surface 10 of squeegee 2 in contact with powder 4 on the upstream side in relative movement direction 7 of base material 3, and inclination angle 6 of surface 10 of squeegee 2 in contact with powder 4 may be adjusted without adjusting the powder feeding amount. Further alternatively, the powder feeding amount may be further adjusted after inclination angle 6 of surface 10 of squeegee 2 in contact with powder 4 is adjusted. Yet alternatively, inclination angle 6 of surface 10 of squeegee 2 in contact with powder 4 and the powder feeding amount may be adjusted simultaneously. In any case, the effect of controlling powder accumulation height 20 can be similarly obtained. Given this, in powder coating device 1, ratio Z of powder accumulation height 20 and distance 21 of the gap between base material 3 and squeegee 2 can be easily controlled to a desired range. In particular, by setting Z to a range of greater than 1 and 3 or less, powder 4 is less likely to aggregate and stagnate, and the occurrence of powder clogging can be suppressed, whereby it is possible to perform precise coating with little film thickness variation continuously and stably.

Sixth Exemplary Embodiment

Figure 6:
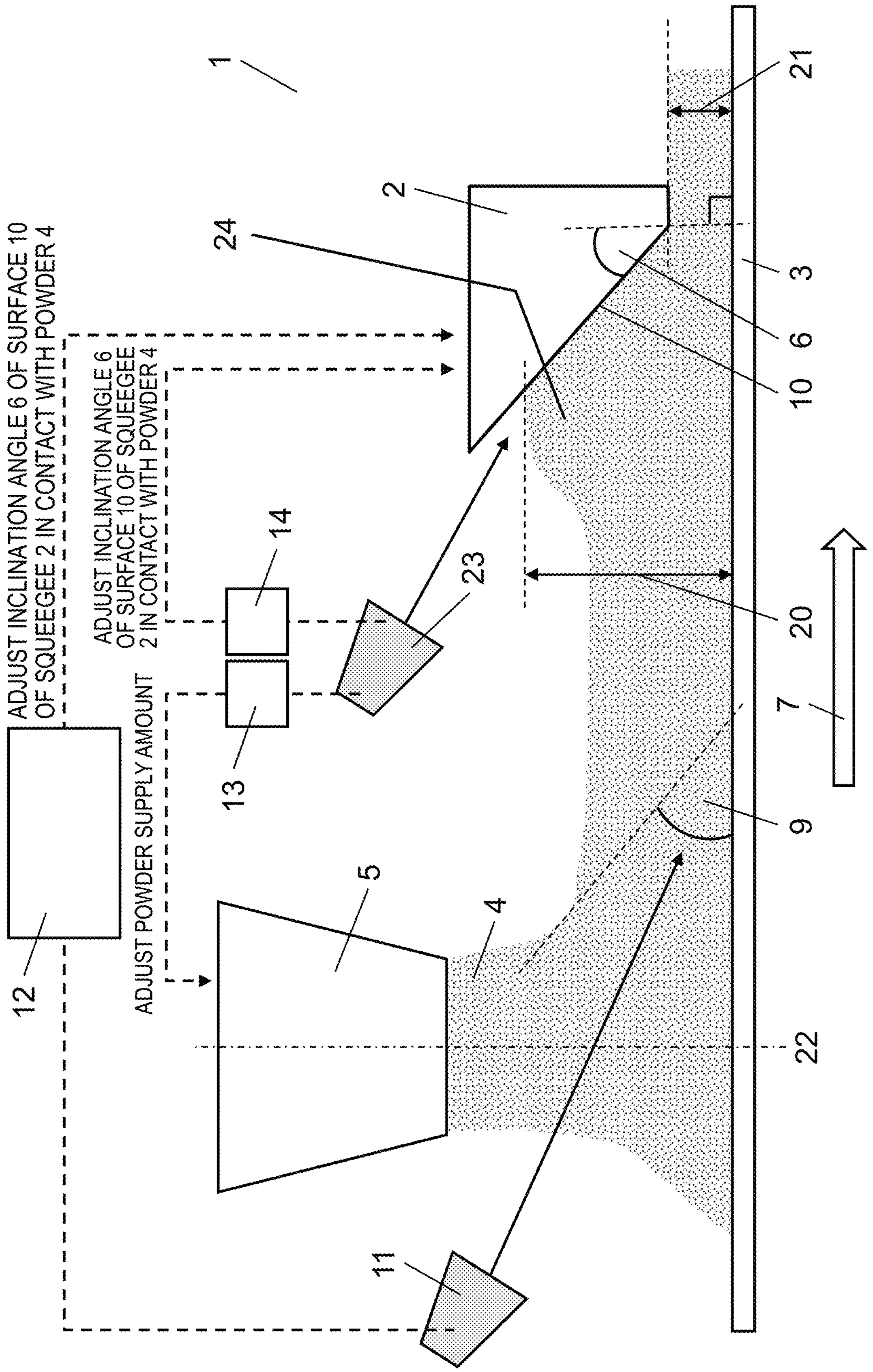
FIG. 6 is a schematic view illustrating a powder coating device according to an exemplary embodiment (sixth exemplary embodiment) of the present disclosure.

FIG. 6 is a schematic view of powder coating device 1 according to an exemplary embodiment of the present disclosure.

Powder coating device 1 of the present disclosure has the same basic configuration as that of exemplary embodiment 4 except that powder coating device 1 of the present disclosure includes third controller 14 that adjusts inclination angle 6 of surface 10 of squeegee 2 in contact with powder 4 on the basis of powder accumulation height 20 detected by powder accumulation height detector 23 at surface 10 of squeegee 2 in contact with powder 4 on the upstream side in relative movement direction 7 of base material 3 with respect to squeegee 2. Therefore, description of the basic configuration of powder coating device 1 of the present exemplary embodiment will be omitted as appropriate.

Powder coating device 1 detects powder accumulation height 20 by powder accumulation height detector 23 on surface 10 of squeegee 2 in contact with powder 4 on the upstream side in relative movement direction 7 of base material 3 with respect to squeegee 2, and adjusts inclination angle 6 of surface 10 of squeegee 2 in contact with powder 4 in addition to adjusting the powder feeding amount to base material 3. In powder coating device 1, ratio Z of powder accumulation height 20 and distance 21 of the gap between base material 3 and squeegee 2 can be easily controlled to a desired range. In particular, by setting Z to a range of greater than 1 and 3 or less, powder 4 is less likely to aggregate and stagnate, and the occurrence of powder clogging can be suppressed, whereby it is possible to perform precise coating with little film thickness variation continuously and stably.

For example, in a case where powder accumulation 24 becomes large and powder accumulation height 20 increases whereby Z approaches 3 while the production is continued, powder coating device 1 first decreases the powder feeding amount. If it is desired to further obtain the effect of suppressing the increase in powder accumulation height 20 in this situation, it is preferable to perform adjustment to increase inclination angle 6 of surface 10 of squeegee 2 in contact with powder 4. With this adjustment, powder coating device 1 can obtain an effect of promoting entry of powder 4 into the gap between base material 3 and squeegee 2, thereby obtaining an effect of further suppressing an increase in powder accumulation height 20.

Alternatively, for example, powder accumulation height 20 may be detected by powder accumulation height detector 23 on surface 10 of squeegee 2 in contact with powder 4 on the upstream side in relative movement direction 7 of base material 3, and inclination angle 6 of surface 10 of squeegee 2 in contact with powder 4 may be adjusted without adjusting the powder feeding amount. Further alternatively, the powder feeding amount may be further adjusted after inclination angle 6 of surface 10 of squeegee 2 in contact with powder 4 is adjusted. Yet alternatively, inclination angle 6 of surface 10 of squeegee 2 in contact with powder 4 and the powder feeding amount may be adjusted simultaneously. In any case, the effect of controlling powder accumulation height 20 can be obtained. Given this, in powder coating device 1, ratio Z of powder accumulation height and distance 21 of the gap between base material 3 and squeegee 2 can be easily controlled to a desired range. In particular, by setting Z to a range of greater than 1 and 3 or less, powder 4 is less likely to aggregate and stagnate, and the occurrence of powder clogging can be suppressed, whereby it is possible to perform precise coating with little film thickness variation continuously and stably.

Hereinafter, exemplary embodiments of the present disclosure will be described in more detail using specific Experimental Examples. Note that the present disclosure is not limited at all by the following Experimental Examples, and can be appropriately modified without changing the gist thereof.

Experimental Example

As an Experimental Example, positive electrode mixture layer 25 containing the positive electrode active material of the all-solid battery and the solid electrolyte was formed by powder coating device 1 of the first to sixth exemplary embodiments. LiNi1/3Co1/3Mn1/3 having an average particle diameter D50 of 5 um was used as a positive electrode active material, Li2S—P2S5 having an average particle diameter D50 of um was used as a solid electrolyte, and a mixture mixed at a volume ratio of 7:3 was formed into a film. Furthermore, by supplying the mixture onto base material 3 on the upstream side in relative movement direction 7 of base material 3 with respect to squeegee 2 and leveling the mixture by powder coating device 1 of the first to sixth exemplary embodiment of the present disclosure, film formation was performed 30 times aiming at a coating width of 50 mm, a coating length of 200 mm, and a film thickness of 300 μm on the aluminum foil as base material 3. The coating speed was 10 m/min. Distance 21 of the gap between base material 3 and squeegee 2 was set to 300 um.

Powder inclination angle detector 11 captured an image of the shadow of powder 4 fed onto base material 3 cast by a light source with the camera, captured the position of the surface of the powder layer composed of powder 4 fed onto base material 3 by image processing such as binarization processing, and detected angle 8 or angle 9 between the surface of the powder layer composed of powder 4 fed onto base material 3 and base material 3.

In the Experimental Example of the first exemplary embodiment, while angle 8 between the surface of the powder layer composed of powder 4 fed from powder feeder 5 to base material 3 and base material 3 was detected on the upstream side in relative movement direction 7 of base material 3 with respect to powder feeding position 22, inclination angle 6 of surface 10 of squeegee 2 in contact with powder 4 was controlled to be greater than or equal to the detected angle 8.

In the Experimental Example of the second exemplary embodiment, while angle 9 between the surface of the powder layer composed of powder 4 fed from powder feeder 5 to base material 3 and base material 3 was detected on the downstream side in relative movement direction 7 of base material 3 with respect to powder feeding position 22, inclination angle 6 of surface 10 of squeegee 2 in contact with powder 4 was controlled to be greater than or equal to the detected angle 9.

Powder accumulation height detector 23 captured an image of a shadow of powder accumulation 24 on surface 10 of squeegee 2 in contact with powder 4 on the upstream side in relative movement direction 7 of base material 3 cast by the light source with the camera, captured the position of the surface of powder accumulation 24 by image processing such as binarization processing, and detected powder accumulation height 20 on surface 10 of squeegee 2 in contact with powder 4 on the upstream side in relative movement direction 7 of base material 3.

In the Experimental Example of the third exemplary embodiment, while angle 8 between the surface of the powder layer composed of powder 4 fed from powder feeder 5 to base material 3 and base material 3 was detected on the upstream side in relative movement direction 7 of base material 3 with respect to powder feeding position 22, inclination angle 6 of surface 10 of squeegee 2 in contact with powder 4 was controlled to be greater than or equal to the detected angle 8. Furthermore, powder accumulation height detector 23 detects powder accumulation height 20 on surface 10 of squeegee 2 in contact with powder 4 on the upstream side in relative movement direction 7 of base material 3 with respect to squeegee 2. Powder coating device 1 controls the powder feeding amount to base material 3 such that ratio Z of powder accumulation height 20 to distance 21 of the gap between base material 3 and squeegee 2 is more than 1 and 3 or less.

In the Experimental Example of the fourth exemplary embodiment, while angle 9 between the surface of the powder layer composed of powder 4 fed from powder feeder 5 to base material 3 and base material 3 was detected on the downstream side in relative movement direction 7 of base material 3 with respect to powder feeding position 22, inclination angle 6 of surface 10 of squeegee 2 in contact with powder 4 was controlled to be greater than or equal to the detected angle 9.

Furthermore, powder accumulation height detector 23 detects powder accumulation height 20 on surface 10 of squeegee 2 in contact with powder 4 on the upstream side in relative movement direction 7 of base material 3 with respect to squeegee 2. Powder coating device 1 controls the powder feeding amount to base material 3 such that ratio Z of powder accumulation height 20 to distance 21 of the gap between base material 3 and squeegee 2 is more than 1 and 3 or less.

In the Experimental Example of the fifth exemplary embodiment, while angle 8 between the surface of the powder layer composed of powder 4 fed from powder feeder 5 to base material 3 and base material 3 was detected on the upstream side in relative movement direction 7 of base material 3 with respect to powder feeding position 22, inclination angle 6 of surface 10 of squeegee 2 in contact with powder 4 was controlled to be greater than or equal to the detected angle 8. Furthermore, powder accumulation height detector 23 detects powder accumulation height 20 on surface 10 of squeegee 2 in contact with powder 4 on the upstream side in relative movement direction 7 of base material 3 with respect to squeegee 2. Powder coating device 1 controls the powder feeding amount to base material 3 such that ratio Z of powder accumulation height 20 to distance 21 of the gap between base material 3 and squeegee 2 is more than 1 and 3 or less. When a sign that Z is out of the range of more than 1 and 3 or less is observed while the transition of Z is monitored in this situation, inclination angle 6 of surface 10 of squeegee 2 in contact with powder 4 is controlled.

In the Experimental Example of the sixth exemplary embodiment, while angle 9 between the surface of the powder layer composed of powder 4 fed from powder feeder 5 to base material 3 and base material 3 was detected on the downstream side in relative movement direction 7 of base material 3 with respect to powder feeding position 22, inclination angle 6 of surface 10 of squeegee 2 in contact with powder 4 was controlled to be greater than or equal to the detected angle 9. Furthermore, powder accumulation height detector 23 detects powder accumulation height 20 on surface 10 of squeegee 2 in contact with powder 4 on the upstream side in relative movement direction 7 of base material 3 with respect to squeegee 2. Powder coating device 1 controls the powder feeding amount to base material 3 such that ratio Z of powder accumulation height 20 to distance 21 of the gap between base material 3 and squeegee 2 is more than 1 and 3 or less. When a sign that Z is out of the range of more than 1 and 3 or less is observed while the transition of Z is monitored in this situation, inclination angle 6 of surface 10 of squeegee 2 in contact with powder 4 is controlled.

In addition, as Comparative Examples, film formation was similarly performed in the case of using the blade-shaped squeegee 100 of the prior art illustrated in FIGS. 9 and 10 (Comparative Example 1), the case of vibrating cylindrical squeegee 150 of the prior art illustrated in FIGS. 11 and 12 in relative movement direction 7 of base material 3 with respect to squeegee 150 and the direction opposite thereto while maintaining shortest distance 109 between squeegee 150 and base material 3 (Comparative Example 2), and the case of vibrating cylindrical squeegee 150 of the prior art illustrated in FIGS. 13 and 14 in the direction perpendicular to relative movement direction 7 of base material 3 with respect to squeegee 150 while maintaining shortest distance 109 between squeegee 150 and base material 3 (Comparative Example 3). Here, the vibration conditions of squeegee 150 were conditions disclosed in PTL 2, with the vibration frequency of squeegee 150 being 700 Hz and the amplitude being 5 μm.

The coating continuity in the case of forming a plurality of positive electrode mixture layers 25 was evaluated as "C" when powder clogging occurred in squeegee 150 at least once and normal film formation was not possible, and as "A" when powder clogging did not occur and normal film formation was possible in all cases.

Figure 8:
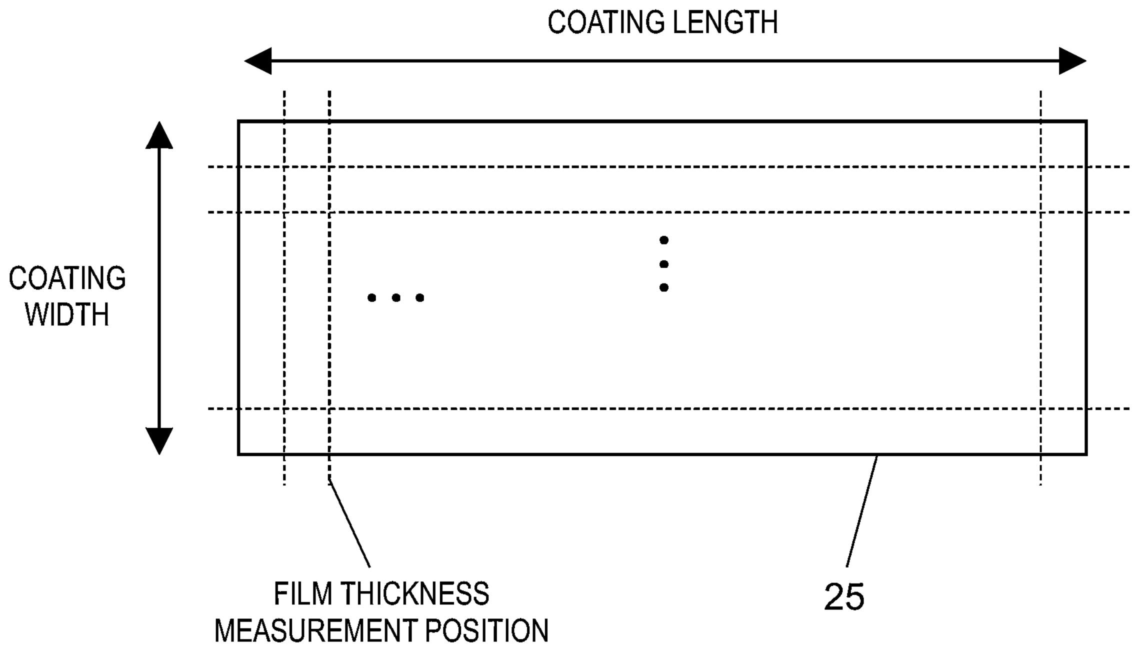
FIG. 8 is a diagram showing a schematic view of a positive electrode mixture layer according to an exemplary embodiment of the present disclosure and a film thickness measurement position as viewed from above.

Furthermore, with respect to the film thickness variation of the obtained positive electrode mixture layer 25, the film thickness variation in the surface of positive electrode mixture layer 25 was measured so as to intersect the powder layer at intervals of 5 mm in the coating width direction and the coating direction as shown in FIG. 8 using a laser displacement meter, and with respect to the maximum value of the film thickness variation ((maximum value of film thickness−minimum value)/(film thickness average value)) in each powder layer, a value of less than ±2.5% was evaluated as "A", a value of ±2.5% or more and less than ±5% was evaluated as "B", and a value of ±5% or more was evaluated as "C". Note that, when powder clogging occurred in squeegee 150 at least once during coating of a predetermined number of films and normal film formation was not possible, the measurement was not performed and a symbol "−" is given, and the film thickness variation was evaluated only when powder clogging did not occur and normal film formation was possible in all cases.

Table 1 in FIG. 15 shows results of each exemplary embodiment according to the present disclosure (Experimental Examples 1 to 6) and results of Comparative Examples according to the prior art. Table 1 shows the results at the time when a total of 10 positive electrode mixture layers 25 were formed in each of the Experimental Examples and the Comparative Examples, and the results at the time when 20 positive electrode mixture layers 25 were additionally formed, thus a total of 30 positive electrode mixture layers 25 were formed in each of the Experimental Examples and the Comparative Examples.

From the results shown in Table 1, when compared at the time when 10 film formations were performed, powder clogging did not occur in any of Experimental Examples 1 to 6 corresponding to the first to sixth exemplary embodiments of the present disclosure, and film formation could be performed normally, whereas in Comparative Examples 1 to 3 according to the prior art, powder clogging occurred in all of the Comparative Examples, and a situation occurred in which normal film formation was not possible.

As described above, in the prior art, aggregation proceeded in a stationary state, thereby promoting a decrease in fluidity of powder 4, and the effect of suppressing powder clogging for realizing coating continuity, which is essential for mass production, was insufficient for powder 4 having a very small particle diameter of several tens of μm to sub-μm, for example.

On the other hand, in Experimental Examples 1 to 6 corresponding to the first to sixth exemplary embodiments of the present disclosure, the fluidity of powder 4 in the state of being fed onto base material 3 immediately before leveling with squeegee 2 was comprehended in order to form a powder layer with less film thickness variation. In Experimental Examples 1 to 6, the configuration condition of squeegee 2 (inclination angle 6 of surface 10 of squeegee 2 in contact with powder 4) was controlled on the basis of the fluidity of powder 4, and powder accumulation height 20 was detected by powder accumulation height detector 23 on surface 10 of squeegee 2 in contact with powder 4 on the upstream side in relative movement direction 7 of base material 3, and the powder feeding amount to base material 3 and the configuration condition of squeegee 2 (inclination angle 6 of surface 10 of squeegee 2 in contact with powder 4) were controlled. As a result, it was possible to sufficiently obtain the effect of suppressing powder clogging for realizing coating continuity, which is essential for mass production, even for powder 4 having a very small particle size of, for example, several tens of μm to sub-μm, in which aggregation proceeds and reduction in fluidity of powder 4 is promoted in a stationary state.

From the results shown in Table 1, even when compared at the time when 30 films were formed, in Experimental Examples 1 to 6 corresponding to the first to sixth exemplary embodiments of the present disclosure, powder clogging did not occur in any of the Experimental Examples, and films could be formed normally in all cases. Given this, it was also found that, in Experimental Examples 1 to 6 corresponding to the first to sixth exemplary embodiments of the present disclosure, aggregation proceeds in a stationary state to promote decrease in fluidity of powder 4, and it is possible to sufficiently obtain the effect of suppressing powder clogging for realizing coating continuity required for mass production even for very small powder 4 having a particle diameter of several tens of μm to sub-μm, for example.

In addition, with respect to the film thickness variation of Experimental Examples 1 to 6 corresponding to the first to sixth exemplary embodiments of the present disclosure, when the time point at which 10 films were formed and the time point at which 30 films were formed were compared with each other, it was found that the number of films formed in Experimental Examples 3 and 4 was greater than that in Experimental Examples 1 and 2 while suppressing the film thickness variation, and the number of films formed in Experimental Examples 5 and 6 was greater than that in Experimental Examples 3 and 4 while suppressing the film thickness variation. This is because in Experimental Examples 1 and 2, the fluidity of powder 4 fed onto base material 3 immediately before leveling by squeegee 2 was comprehended, and the configuration condition of squeegee 2 (inclination angle 6 of surface 10 of squeegee 2 in contact with powder 4) was controlled on the basis thereof. In addition, in comparison with Experimental Examples 1 and 2, in Experimental Examples 3 and 4, a function of detecting powder accumulation height 20 by powder accumulation height detector 23 on surface 10 of squeegee 2 in contact with powder 4 on the upstream side in relative movement direction 7 of base material 3 and controlling the powder feeding amount to base material 3 was added. Furthermore, in comparison with Experimental Examples 3 and 4, in Experimental Examples 5 and 6, a function of detecting powder accumulation height 20 by powder accumulation height detector 23 at surface 10 of squeegee 2 in contact with powder 4 on the upstream side in relative movement direction 7 of base material 3, and controlling the configuration condition of squeegee 2 (inclination angle 6 of surface 10 of squeegee 2 in contact with powder 4) was added. This is considered to be because, as in Experimental Examples 1 and 2, Experimental Examples 3 and 4, and Experimental Examples 5 and 6, as the function of comprehending the fluidity of powder 4 and the state of powder accumulation 24 and controlling the coating conditions increases, the effect of increasing the responsiveness to changes in the fluidity of powder 4 and the state of powder accumulation 24 is obtained while coating is continued.

Here, in the exemplary embodiments of the present disclosure, the group of particles containing the active material is used as an example of powder 4, but similar effects can be obtained in powders of other functional materials, and the raw material, composition, particle shape, and particle diameter are not particularly limited. In addition, powder 4 may contain only one kind of powder or two or more kinds of powders.

Furthermore, base material 3 is an elongated thin plate, and is unwound from a wound state, and wound after coating, but is not limited to such a mode. Base material 3 having a desired shape may be relatively moved with respect to squeegee 2 by a driving device, which is not illustrated, and after finishing the application of powder 4, new base substrate 3 may be intermittently relatively moved with respect to squeegee 2 by the driving device, which is not illustrated. Furthermore, base material 3 may not be wound in a roll shape. Base material 3 is not limited to a sheet shape, and may have any shape as long as powder 4 can be applied using powder coating device 1. In the present exemplary embodiment, base material 3 is a current collector including a metal foil, but the material is not particularly limited, and any base material can be used as long as the base material can be coated with powder 4 using powder coating device 1.

Although first controller 12, second controller 13, and third controller 14 are separately described in order to disclose the control details in the present exemplary embodiment, there is no problem even if these controllers are integrated.

According to the present disclosure, it is possible to form a powder layer with less film thickness variation on a surface of a base material.

INDUSTRIAL APPLICABILITY

Since the powder coating device of the present disclosure can produce a uniform powder layer with little variation in film thickness without using a solvent, the powder coating device can also be used for forming a mixture layer or the like of a high-quality energy device (for example, an all-solid battery or the like).

REFERENCE MARKS IN THE DRAWINGS

1 powder coating device
2 squeegee
3 base material
4 powder
5 powder feeder
6 inclination angle of surface of squeegee in contact with powder
7 relative movement direction of base material with respect to squeegee
8 angle between surface of powder layer composed of powder fed from powder feeder to base material and base material on upstream side in relative movement direction of base material with respect to squeegee
9 angle between surface of powder layer composed of powder fed from powder feeder to base material and base material on downstream side in relative movement direction of base material with respect to squeegee
10 surface of squeegee in contact with powder
11 powder inclination angle detector
12 first controller
13 second controller
14 third controller
20 powder accumulation height
21 distance of gap between base material and squeegee
22 powder feeding position
23 powder accumulation height detector
24 powder accumulation
25 positive electrode mixture layer
100 blade-shaped squeegee in prior art
109 shortest distance between squeegee and base material
150 cylindrical squeegee in prior art

The invention claimed is:

1. A powder coating device comprising:
a powder feeder that feeds powder onto a surface of a base material;
a squeegee that is disposed to form a gap with respect to the base material and has a surface in contact with the powder fed onto the surface of the base material, the squeegee being configured to adjust a thickness of a powder layer composed of the powder fed onto the surface of the base material by the powder feeder and move relative to the base material in a state where an inclination angle of the surface of the squeegee with respect to a normal direction of the surface of the base material is changeable;
a powder inclination angle detector that detects an angle between a surface of the powder layer and the base material; and
a first controller that adjusts the inclination angle of the surface of the squeegee in contact with the powder based on the inclination angle of the powder layer detected by the powder inclination angle detector.

2. The powder coating device according to claim 1, wherein the powder inclination angle detector is disposed on at least one of an upstream side and a downstream side in a relative movement direction of the base material with respect to the squeegee with respect to a powder feeding position to the base material.

3. The powder coating device according to claim 1, further comprising a powder accumulation height detector that detects a height of a powder accumulation on the surface of the squeegee on an upstream side in a relative movement direction of the base material with respect to the squeegee.

4. The powder coating device according to claim 3, further comprising a second controller that adjusts a powder feeding amount to the base material based on the powder accumulation height detected by the powder accumulation height detector.

5. The powder coating device according to claim 3, further comprising a third controller that adjusts the inclination angle of the surface of the squeegee based on the powder accumulation height detected by the powder accumulation height detector.

6. The powder coating device according to claim 1, wherein the angle between the surface of the powder layer and the base material is equivalent to a repose angle of the powder in a state of being fed onto the base material.

* * * * *